(12) United States Patent
Gießibl

(10) Patent No.: US 9,284,998 B2
(45) Date of Patent: Mar. 15, 2016

(54) FREEWHEEL HUB COMPRISING A MAGNETO-ELASTIC SENSOR AND BICYCLE, PEDELEC, FAST PEDELEC OR E-BIKE COMPRISING THE FREEWHEEL HUB

(71) Applicant: Methode Electronics Malta Ltd, Mriehel (MT)

(72) Inventor: Johannes Gießibl, Amerang (DE)

(73) Assignee: Methode Electronics Malta Ltd., Mriehel (MT)

( * ) Notice: Subject to any disclaimer, the term of this patent is extended or adjusted under 35 U.S.C. 154(b) by 0 days.

(21) Appl. No.: 14/262,859

(22) Filed: Apr. 28, 2014

(65) Prior Publication Data

US 2014/0326568 A1    Nov. 6, 2014

(30) Foreign Application Priority Data

May 3, 2013 (EP) .................................. 13166421

(51) Int. Cl.
*F16D 41/24* (2006.01)
*B62M 6/50* (2010.01)

(52) U.S. Cl.
CPC ............. *F16D 41/24* (2013.01); *B62M 6/50* (2013.01); *B62K 2207/00* (2013.01)

(58) Field of Classification Search
None
See application file for complete search history.

(56) References Cited

U.S. PATENT DOCUMENTS

| | | | |
|---|---|---|---|
| 4,896,544 A * | 1/1990 | Garshelis | 73/862.333 |
| 2011/0133542 A1 | 6/2011 | Ratti et al. | |
| 2013/0049444 A1 | 2/2013 | Kitamura | |
| 2013/0049445 A1 | 2/2013 | Kitamura | |
| 2014/0360285 A1 * | 12/2014 | Barraco | G01L 3/102 73/862.333 |

OTHER PUBLICATIONS

Extended European Search Report dated Sep. 25, 2013, in European Patent Application No. 13 166 421.1.

* cited by examiner

*Primary Examiner* — Richard Lorence
(74) *Attorney, Agent, or Firm* — Plumsea Law Group, LLC

(57) ABSTRACT

A freewheel hub and a bicycle, pedelec, fast pedelec or e-bike comprising this freewheel hub is provided. The freewheel hub includes a rotating hub shell for carrying a free running wheel. Torque is coupled to the rotating hub shell via a torque transmitting member. At least one magneto-elastically active region is directly or indirectly attached to or forms a part of the torque transmitting member in such a manner that the applied torque is transmitted to the active region including at least one magnetically polarized region. The magnetic polarization becomes increasingly helically shaped as the applied torque increases. A magneto-elastic sensor including at least one magnetic field sensor is arranged proximate to the at least one magneto-elastically active region for outputting a signal corresponding to a torque-induced magnetic flux emanating from the magnetically polarized region.

13 Claims, 7 Drawing Sheets

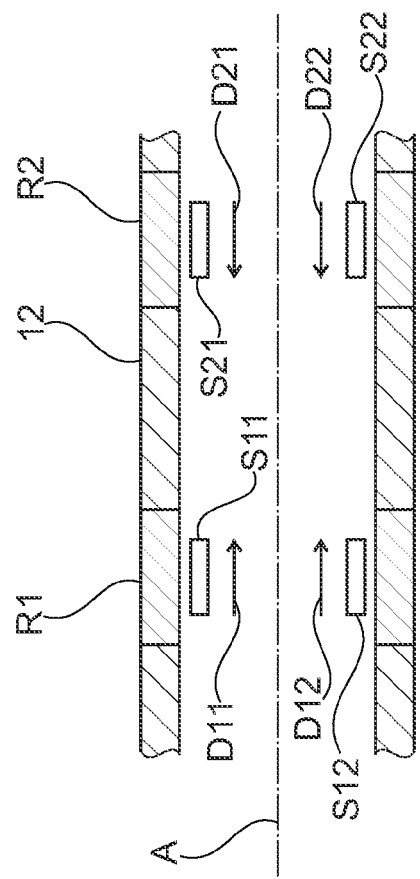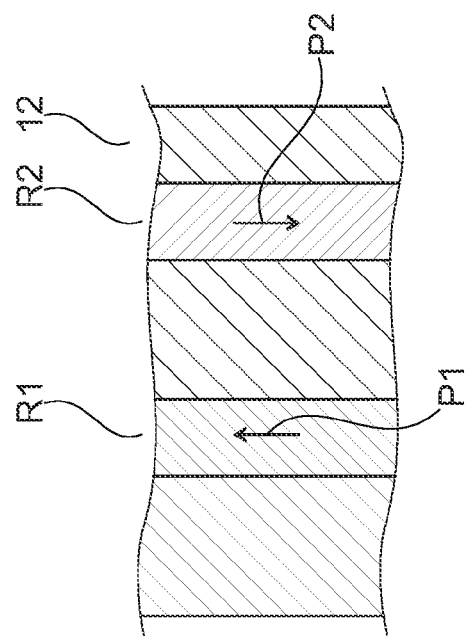

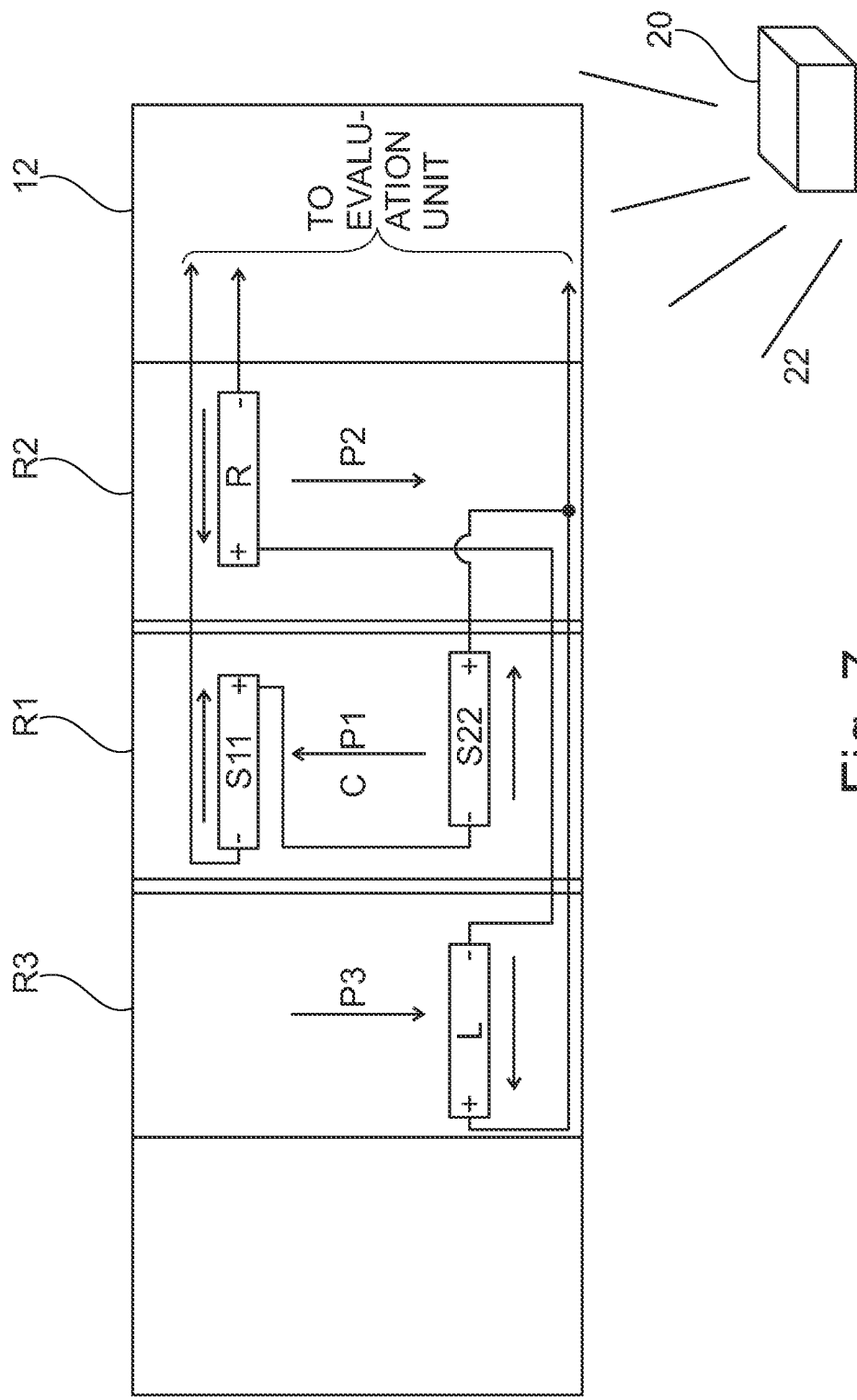

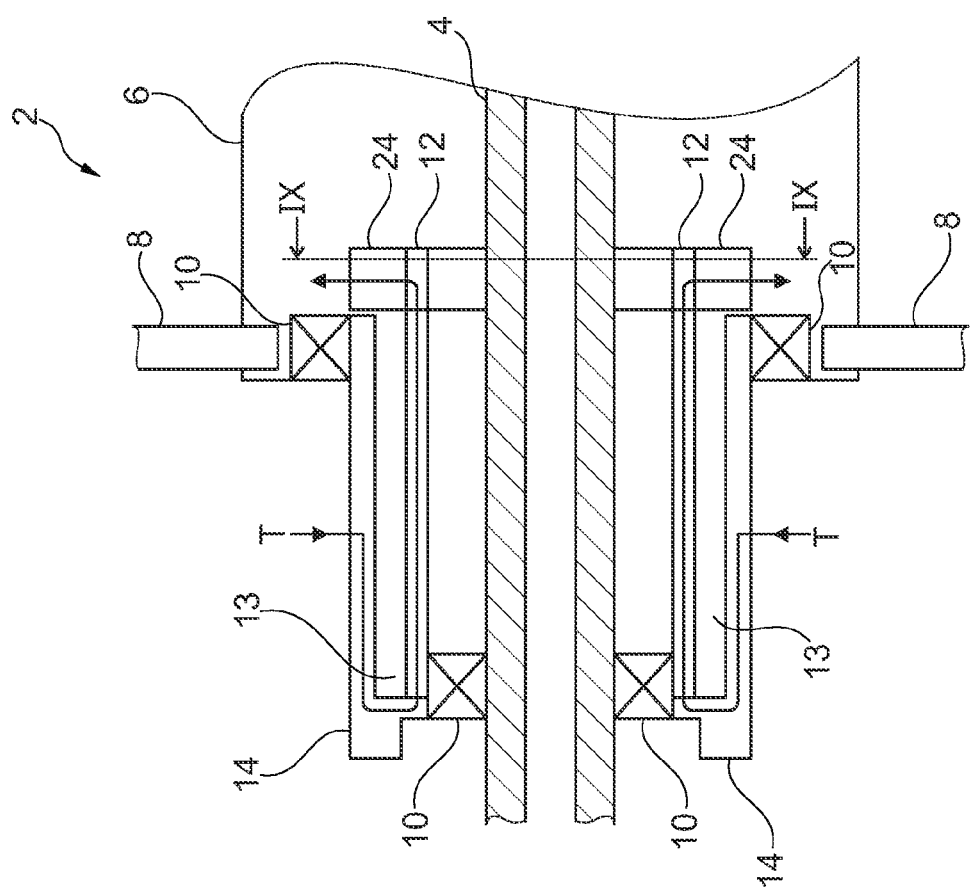
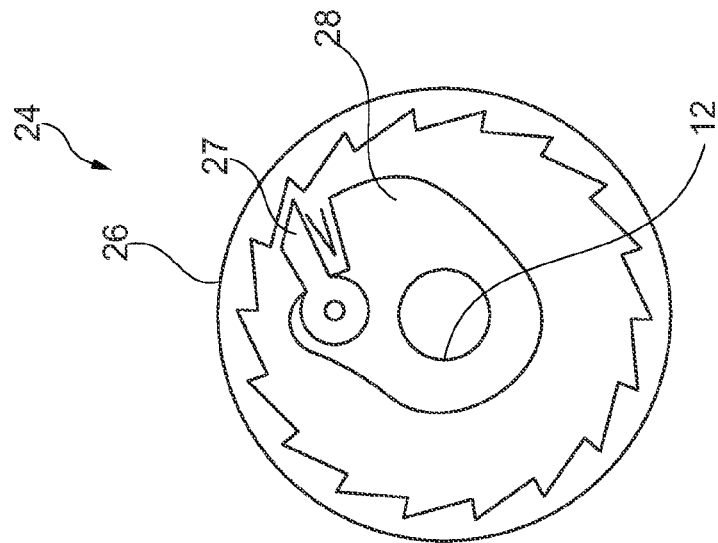

FREEWHEEL HUB COMPRISING A MAGNETO-ELASTIC SENSOR AND BICYCLE, PEDELEC, FAST PEDELEC OR E-BIKE COMPRISING THE FREEWHEEL HUB

FIELD OF THE INVENTION

The invention relates to a freewheel hub comprising a rotating hub shell for carrying a free running wheel, wherein at least one magneto-elastic sensor is incorporated in the freewheel hub for determination of an applied torque. The invention further relates to a bicycle, a pedelec, a fast pedelec or an e-bike comprising this freewheel hub.

BACKGROUND

Bicycles and ergometers are frequently used as training devices or as a medical device, for example for rehabilitation. The force and power output, which a user or a patient applies to his training device, are parameters, which are of interest for various reasons. These can be determined by measuring the torque, which the user applies via the pedal cranks to the bicycle. Training or medical data can be derived from the value of the applied torque, or an automatic gear shift can be initiated. Furthermore, the applied torque is a parameter, which can be displayed on a multipurpose display or bicycle computer for monitoring the use of the bicycle or ergometer.

German patent application DE 10 2007 040 016 A1 discloses a torque measurement device for an ergometer. The device is integrated in the bottom bracket bearing. The torque, which is induced in the bottom bracket shaft via a respective one of the pedal cranks being linked to this shaft, is determined. The torque transmission results in elastic torsion of the shaft. This torsion is subject to measurement. The applied torque is derived from the amount of torsion. The applied force or torque can be detected for both, the left and the right crank being driven by the left and right leg of the user, respectively. This separate acquisition of torque data, however, requires that the torque transmission is from the left end and from the right end of bottom bracket shaft to the center of the shaft. At the center of the shaft, a driving sprocket wheel or a pulley can be mounted. This particular design is, however, only applicable in ergometers. This derives from the fact that in almost every bicycle, the bottom bracket shaft carries the driving sprocket wheel proximate to one of the ends of the shaft, i.e. near to the left or right pedal crank. Within a bicycle having this type of bottom bracket shaft, the torque measurement device only captures the torque, which is applied via the pedal crank, which is opposite to the driving sprocket. The torque of this pedal crank is transmitted to the sprocket via the bottom bracket shaft and is therefore accessible. In other words, the torque measurement device according to reference DE 10 2007 040 016 A1 is only suitable for determination of the torque, which is applied via either the left or the right pedal crank.

Another prior art torque measurement device is disclosed in German utility model DE 20 2007 019 291 U1. A bottom bracket shaft having a first and a second hollow shaft member, which are rotationally fixed to one another, incorporates a torque sensor device within one of the shaft members. The induced torque is acquired using a magnetic sensor device. The torque measurement device is, however, only designed for acquisition of torque, which is applied via one of the two pedal cranks. As a result, the applied torque of only one leg of the user of the bicycle may be determined.

For pedelecs or e-bikes, it is desirable to have access to the torque, which is applied via both legs of the user. The applied torque can serve as a parameter for the control of an auxiliary electric drive. For example, the drive can be activated, when the applied torque exceeds a certain threshold. In addition to this, it is desirable to have a value for the torque at hand, which is applied by the auxiliary electric drive. This may serve as a value for overload protection.

SUMMARY

It is an object of the invention to provide a device, which is suitable for determination of a torque, which is applied to a free running wheel. Furthermore, it is an object of the invention to provide an enhanced torque measurement within a bicycle, a pelelec or within an e-bike having a free running wheel.

In one aspect of the invention, a freewheel hub comprising a rotating hub shell for carrying a free running wheel is provided. A torque is coupled to the rotating hub shell via a torque transmitting member, which is coupled to the hub shell or forms a part of the hub shell. The freewheel hub is provided with at least one magneto-elastically active region, which is directly or indirectly attached to or forms a part of the torque transmitting member. The magneto-elastically active region is configured in that the applied torque is transmitted to the active region comprising at least one magnetically polarized region. The polarization becomes increasingly helically shaped as the applied torque increases. Furthermore, the freewheel hub comprises a magneto-elastic sensor means having at least one magnetic field sensor being arranged proximate to the at least one magneto-elastically active region. The at least one sensor is configured to output a signal corresponding to a torque induced magnetic flux emanating from the magnetically polarized region.

Advantageously, the torque measurement is directly performed at the freewheel hub. This can be incorporated in a bicycle, an e-bike or in a pedelec. Within the context of this specification, an e-bike, a pedelec, a fast pedelec and all other kinds of bicycles comprising an electric drive, in particular an auxiliary electric drive, shall be referred to as an e-bike.

Because the torque measurement device is incorporated in the freewheel hub, the torque value, which is accessible, is not restricted to a torque, which is applied via the left or right pedal crank, i.e. via a single pedal crank. In contrast to the torque measurement devices, which are incorporated in the bottom bracket shaft, a total value of the torque, which is applied to the free running wheel, can be determined. For example, the freewheel is driven by a bicycle chain and a corresponding set of toothed sprockets, wherein a typically larger driving sprocket is arranged at a bottom bracket bearing shaft and the driven sprocket is coupled to the freewheel hub. Within a bicycle or e-bike, the total torque is transmitted via the bicycle chain to the free running rear wheel. This is due to the fact that the auxiliary drive of an e-bike is frequently integrated in or arranged at the sleeve incorporating the bottom bracket bearing. However, even for e-bikes having an auxiliary electric drive, which is integrated into the rear wheel hub, the freewheel hub according to aspects of the invention is applicable. For this type of e-bike, the torque, which is generated by the electric drive, can be directly coupled to the torque transmitting member or to the sprocket support member, which does not carry a sprocket in this configuration, and further to the rotating hub shell. For example, the torque transmitting member can be driven by a suitable planetary gear. The planet gears or pinions of the planetary gear can engage with the torque transmitting member, which can be a shaft having an outer or inner toothing.

Irrespective of the particular design of the bicycle or e-bike, the value for the total torque, which is applied by a user and/or by the auxiliary electric drive, can be measured. This is particularly advantageous for an e-bike. The acquired values for the total torque can serve as parameters for the control of the auxiliary electric drive. For example, the output power of the electric drive can be lowered when the torque exceeds a certain or critical threshold value. When the auxiliary drive is deactivated, the total torque equals the torque, which is applied by the user. In this situation, the electric drive can be activated when the user applied torque reaches a further threshold value. This enables the control of the electric drive to activate the drive in that the e-bike is easy to the joints of the user. In addition to this, the torque, which is applied by the user, can be an interesting parameter for example for display on a multipurpose bicycle computer. This advantageously also applies to bicycles having no auxiliary drive. When the freewheel hub according to aspects of the invention is applied in an ergometer, the user applied torque can be a parameter, which is of interest for therapeutic treatment of a patient.

According to an advantageous embodiment of the invention, the rotating hub shell is supported by a non-rotating fixed axle. This can be mounted to a frame of the bicycle or the e-bike. Furthermore, the magneto-elastic sensor means can be fixed on the axle. In particular, the magneto-elastic sensor means is arranged in that it has a fixed position. In other words, the sensor means is a non-rotating part of the freewheel hub. The term "non-rotating" is understood in that the sensor means has a fixed coordination, for example with respect to the frame of the bicycle or e-bike. This non-rotating sensor configuration facilitates the wiring thereof, if necessary. For example, this pertains to the wiring for power supply and/or data transmission to and from the sensor means.

According to another embodiment of the invention, the torque transmitting member is a shaft. In particular, the torque transmitting shaft is coupled to a front of the rotating hub shell. A freewheel device or an overrunning clutch device can be coupled to the torque transmitting member. In particular, the freewheel device or overrunning clutch device can be arranged between the torque transmitting member and the hub shell. The torque transmitting member can be driven for example by a toothed sprocket, which is further driven by a bicycle chain. The latter typically engages a larger driving toothed sprocket, which is arranged at the bottom bracket bearing. Within an e-bike comprising an electric drive, which is arranged at the bottom bracket, the torque, which is applied via the bicycle chain, is a total torque which is supplied by the user and by the electric drive. This total torque can be either the user applied torque or the torque of the electric drive plus the user applied torque. This depends on whether the auxiliary electric drive is activated or deactivated. A signal, which indicates the operating status of the electric drive, is usually available within the drive control. Consequently, by taking this status signal into account, the user applied torque and the torque of the electric drive are easily distinguishable.

A particularly compact and robust freewheel hub can be provided by integration of the sensor means into an interior space of the torque transmitting shaft. According to this aspect of the invention, the torque transmitting shaft is a hollow shaft comprising this interior space. The magnetic field sensors of the sensor means are arranged inside the interior space. In particular, the magnetic field sensors are entirely arranged inside the interior space. The sensors are advantageously protected from environmental influence such as dust, rain or other contamination. This renders the freewheel nub particularly reliable even under harsh operating conditions. Advantageously, the freewheel hub can be used in off-road bicycles or mountain bikes.

According to still another advantageous embodiment of the invention, the at least one magnetic field sensor has a sensing direction, which is at least substantially parallel to a shaft axis. This sensor configuration is suitable to detect an axial component of the torque induced magnetic flux emanating from the magnetically polarized region. The sensor means can further comprise at least two magnetic field sensors, which are arranged in that the sensing directions of the sensors are at least substantially 180° opposite to each other. This "vice versa" configuration advantageously allows a differential measurement of the torque induced magnetic flux. The measurement of the torque is more sensitive on the one hand and more reliable on the other hand.

According to an advantageous embodiment of the invention the at least one magneto-elastically active region projects along a circumference of the torque transmitting member. The at least one region can be magnetized in that all of the domain magnetizations of the region lie within at most a plus or a minus 45° limit of a circumferential direction of the torque transmitting member or shaft. Advantageously, the circumferential magnetizations can be provided by suitably conditioning of the shaft material, for example using permanent or current magnets. This is to create shaft regions having a residual circumferential magnetization, which forms part of the active region interacting with the magneto-elastic sensor means. However, the torque transmitting member can also be provided with a separate sleeve comprising suitably magnetized material. Further technical details with respect to a magneto-elastic torque measurement of this type are described and depicted in the references: U.S. Pat. No. 6,553,847 B2 and U.S. Pat. No. 5,520,059 of Garshelis, the disclosure of which is incorporated herein by reference in its entirety. In the U.S. '847 reference, the material of a shaft is itself magnetically polarized in circumferential direction. Therefore, this sensor dispenses with a separate sleeve or ring comprising magnetic material. A torque measurement device comprising a separate sleeve is disclosed in the U.S. '059 reference.

According to still another advantageous embodiment of the invention, the torque transmitting member comprises a first magneto-elastically active region and a second Magneto-elastically active region. The first and the second region are axially spaced and directly or indirectly attached to or form a part of the torque transmitting member. The configuration of the magneto-elastically active regions is such that the torque is transmitted to the active regions. Each active region comprises a magnetically polarized region, wherein the magnetic polarization of the first active region and the magnetic polarization of the second active region are substantially opposite with respect to each other, The magnetic sensor means of the freewheel hub according to this embodiment of the invention comprises a first pair of sensors having a first and a second magnetic field sensor being arranged proximate to the first magneto-elastically active region. These sensors output a first signal corresponding to a torque induced magnetic flux emanating from the first magnetically polarized region. Furthermore, the magnetic sensor means is provided with a second pair of sensors. This second pair comprises another first and second magnetic field sensor. The sensors of this second pair are arranged proximate to the second magneto-elastically active region. The second sensor pair outputs a second signal corresponding to a torque induced magnetic flux emanating from the second magnetically polarized region. In addition to this, the freewheel hub, according to this embodiment of the invention, comprises a control unit, which is configured for determination of the applied torque. The control unit performs a differential evaluation of the signals of the first pair of sensors and the signals of the second pair of sensors. The differential measurement of the torque using a first and a second magnetically polarized region is less error-prone, in particular in the presence of external magnetic fields.

According to still another advantageous embodiment of the invention, the magnetic sensor means comprises a plurality of primary magnetic field sensors, which are arranged proximate to a first magneto-elastically active region. The primary magnetic field sensors output a first signal, which corresponds to a torque dependent magnetic flux emanating from the first active region. Furthermore, the magnetic sensor means comprises at least one secondary magnetic field sensor, which is axially spaced in a first direction by a predetermined first distance from the plurality of primary magnetic field sensors. This at least one secondary magnetic field sensor is arranged proximate to a second magneto-elastically active region. The at least one secondary magnetic field sensor outputs a second signal, which corresponds to a torque dependent magnetic flux emanating from this second active region. The at least one secondary magnetic field sensor is also configured for measuring an ambient magnetic flux emanating from a near field magnetic field source.

The freewheel hub according to this embodiment of the invention comprises at least one further secondary magnetic field sensor. This further sensor is axially spaced in a second direction, which is substantially opposite to the first direction. The further secondary sensor is distanced from the plurality of primary magnetic field sensors by a predetermined second distance. This at least one further secondary magnetic field sensor is arranged proximate to a third magneto-elastically active region. It is configured to output a third signal corresponding to a torque dependent magnetic flux emanating from the third active region. In addition to this, similar to the secondary magnetic field sensor, the further secondary magnetic field sensor detects an ambient magnetic flux emanating from the near magnetic field source.

The first to third magneto-elastically active region can be axially spaced or arranged directly adjacent to each other. They can be directly or indirectly attached to or form a part of the torque transmitting member. The configuration of the magneto-elastically active regions is such that the torque is transmitted to the active regions. Each active region comprises a magnetically polarized region, wherein the magnetic polarization of the first and third active region and the magnetic polarization of the second active region are substantially opposite with respect to each other.

In addition to this, the freewheel hub according to the embodiment comprises a means, in particular a control unit, for adjusting the first signal using the second and the third signals, thereby compensating for the effects of the near magnetic field source.

Advantageously, the freewheel hub according to this embodiment of the invention is capable of compensating for the magnetic field from the near magnetic field source. This is particularly advantageous, if the auxiliary electric drive is arranged near to or integrated in the freewheel hub. An electric drive frequently generates a magnetic stray field. This magnetic field does, however, not influence the accuracy of the torque measurement. The magnetic sensor means can compensate for the influence of this near magnetic field using the three groups of magnetic field sensors. A compact freewheel hub having an auxiliary electric drive can be provided, without taking a risk for a less reliable torque measurement.

According to still another embodiment of the invention, the at least one magnetic field sensor is a vector sensor. In particular, the vector sensor is one of: a Hall-effect, a magneto-resistance, a magneto-transistor, a magneto-diode or a MAG-FET sensor. In particular, the magnetic field sensor is a fluxgate. magnetometer. These magnetic field sensors turned out to be particularly suitable for application in a freewheel hub.

In another embodiment of the invention, the torque transmitting member is at least partially formed of a ferromagnetic material suitable to provide a magneto-elastic effect, in particular containing nickel (Ni). An industrial steel as for example X20Cr13 or similar material can be applied. Within this type of torque transmitting member, the circumferential magnetization can reside in the shaft material itself. Consequently, a hub according to this aspect of the invention can dispense with an additional sleeve or ring member comprising the torque exposed magnetic material emanating the torque dependent magnetic flux.

According to another advantageous aspect of the invention, a bicycle, a pedelec (pedal electric cycle), a fast pedelec or an e-bike comprising a freewheel hub according to aspects of the invention is provided. Within this bicycle, pedelec or e-bike, a measurement of the total torque, which is applied to a free running wheel via the freewheel hub, can be performed. Either one or both of a man-induced torque and a torque of the auxiliary electric drive can be determined. This is advantageous for operation and control of the auxiliary electric drive. In particular, activation and de-activation and/or a torque control of the drive can be established.

The bicycle, pedelec, fast pedelec or e-bike can be further provided with a battery powered electric drive, according to another embodiment of the invention. This battery powered electric drive applies a torque to the torque transmitting member. In particular, the drive couples the torque to the torque transmitting shaft of the freewheel hub, according to aspects of the invention. The electric drive can be for example an electric DC-motor operating at 12 V operating voltage,

BRIEF DESCRIPTION OF DRAWINGS

Further aspects and characteristics of the invention ensue from the following description of the preferred embodiments of the invention with reference to the accompanying drawings, wherein FIG. 2 is a simplified side view of a torque transmitting shaft in a freewheel hub according to an embodiment of the invention, FIG. 3 is a simplified cross section of the shaft shown in FIG. 2.

FIG. 7 is a schematic diagram showing the arrangement and the interconnection of the magnetic field sensors according to an embodiment of the invention, FIG. 8 is a detailed simplified cross section of a freewheel hub according to an embodiment of the invention, FIG. 9 is a cross section along line IX-IX in FIG. 8

DETAILED DESCRIPTION OF EXAMPLE EMBODIMENTS

Figure 1:
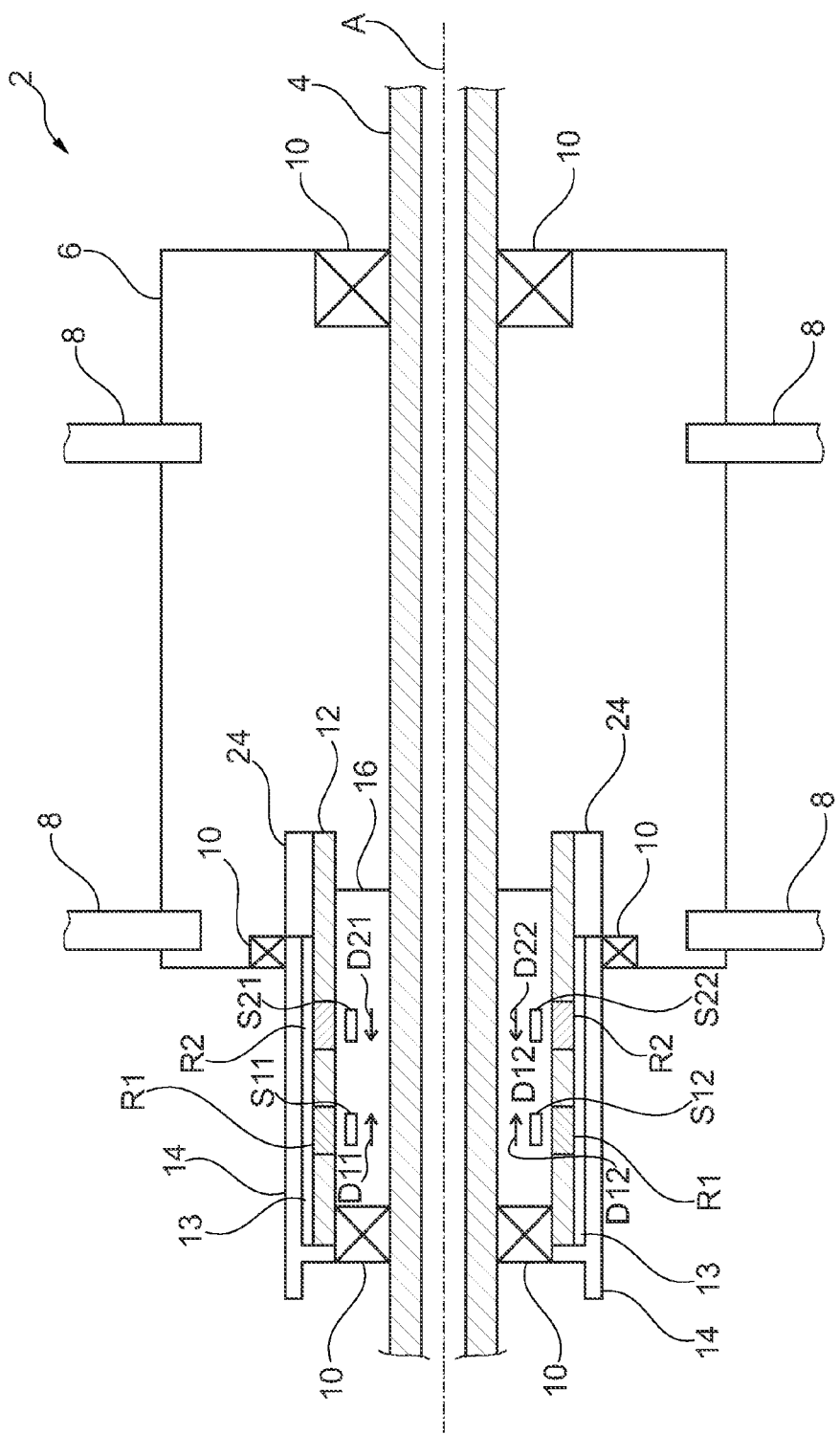
FIG. 1 is a simplified cross section of a freewheel hub according to an embodiment of the invention.

In FIG. 1, there is a simplified cross section of a freewheel hub 2, according to an embodiment of the invention. The freewheel hub 2 comprises a non-rotating fixed axle 4, which is for example mounted on a frame of a bicycle, a pedelec, an e-bike and the like. The left and right end part of the axle 4 can be mounted on the frame of the bicycle using screws, for example. A hub shell 6 carrying a plurality of spokes 8 is rotatably mounted on the fixed axle 4 via the bearings 10. The bearings 10 are located near to a left and right front of the freewheel hub 2. The bearings 10 can be rolling bearings, such as a ball bearing or a needle bearing or any other suitable type of bearing. For example, the freewheel hub 2 carries a rear wheel of a bicycle, a pedelec (pedal electric cycle) or an e-bike. A plurality of spokes 8 is mounted on the rotating hub shell 6. The inner ends of the spokes 8 are fixed on the hub shell 6 along its circumference. At an opposite outer end, the spokes 8 carry a wheel rim forming a part of the free running wheel (not shown).

Torque is applied to the freewheel hub 2 and to the free running wheel via a torque transmitting member 12. According to the embodiment in FIG. 1, the torque transmitting member 12 is coupled to the rotating hub shell 6 at a front side thereof. By way of an example only, it is the left front of the member 12. In FIG. 1, the torque transmitting member 12 is a separate member. This is, however, not necessary. The freewheel hub 2 can be designed in that the torque transmitting member 12 forms an integral part of the rotating hub shell 6.

According to the embodiment in FIG. 1, the torque transmitting member 12 is a hollow shaft. Torque is applied to the member 12 via a sprocket support 14, which is configured to engage with the free end of the torque transmitting member 12 around its circumference. At the opposite end, the sprocket support 14 is rotatably supported with respect to the hub shell 6 using another bearing 10. The torque transmitting member 12 and the hub shell 6 are coupled using a freewheel device 24 or an overrunning clutch (for further details, see also FIGS. 8 and 9). Between the sprocket support member 14 and the torque transmitting member 12, there is an air gap 13, so as to avoid any friction between these two parts. A sprocket (not shown) can be arranged on the sprocket support 14, wherein this sprocket can be driven by a bicycle chain so as to apply a torque to a free running wheel. The bicycle chain typically engages a larger drive sprocket, which is coupled to bottom bracket bearing shaft, which carries a left and a right pedal crank being pedaled by a user of a bicycle. However, other torque transmission devices can be applied for driving the freewheel hub 2. For example, the torque transmission can be performed via a toothed belt or a transmission shaft. Further details with respect to the torque transmission between the sprocket support member 14 and the hub shell 6 will be explained when making reference to FIG. 8.

The freewheel hub 2 further comprises a magneto-elastic sensor means for measuring of a torque, which is transmitted to the free running wheel. The magneto-elastic sensor means has a first pair of sensors comprising a first sensor S11 and a second sensor S12. This first pair of sensors S11, S12 is arranged proximate to a first magneto-elastically active region R1. The magneto-elastic sensor means further comprises a second pair of sensors S21, S22. This second pair comprises a first sensor S21 and a second sensor S22, which interact with a second magneto-elastically active region R2. The sensors S21, S22 are arranged proximate to this region.

The first pair of sensors S11, S12 is configured for detecting a torque-induced magnetic flux emanating from the first active region R1. Similarly, the second pair of sensors S21, S22 is configured to detect a torque-induced magnetic flux emanating from the second active region R2. Upon application of a torque, the polarization of the active regions R1, R2 becomes increasingly helically shaped or oriented as the applied torque increases. A torque-induced shift of the magnetic polarization of a respective one of the active regions R1, R2 is detected by the first and second sensor pair, respectively.

The first and the second magneto-elastically active region R1, R2 form a part of the torque transmitting member 12 in such a manner that the applied torque is transmitted to a respective one of the active regions R1, R2. According to the embodiment of FIG. 1, the active regions R1, R2 are provided by magnetically conditioning the respective regions of the torque member 12 itself. In other words, the material of the torque transmitting member 12 is magnetically polarized. In particular, the torque transmitting member 12 can be manufactured using a ferromagnetic material, which can comprise a certain amount of nickel. The torque transmitting member 12 can be conditioned using magnets (not shown) or current, thereby forming the regions R1, R2.

According to another embodiment (not shown), the magneto-elastically active regions are incorporated in a separate member. This can be a ring or a sleeve comprising magnetically polarized material.

The magneto-elastically active regions R1, R2, irrespective they are formed within the shaft or within a separate member, can project along the entire circumference of the torque transmitting member 12. They have a circumferential magnetization.

In particular, the sensors S11, S12, S21 and S22 are vector sensors. For example, the sensors are one of a Hall-effect, a magneto-resistance, a magneto-transistor, a magneto-diode or a MAGFET field transistor sensor. Furthermore, a fluxgate magnetometer can be applied as a magnetic sensor. When vector sensors are applied, every sensor S11, S12, S21 and S22 has a certain sensing direction D11, D12, D21 and D22. A sensor of the first group (i.e. one of the sensors S11, S12) and a sensor of the second group (i. e. one of the sensors S21, S22) can be configured to have sensing directions D11, D12 and D21, D22, which are at least substantially 180° opposite with respect to each other. Furthermore, the sensing directions D11, D12, D21, D22 of all sensors S11, S12, S21 and S22 can be substantially parallel to a shaft axis A, which is shown in FIG. 1 as a dash-dot line.

In particular, the first and the second magneto-elastically active region R1, R2 are circumferentially magnetized in that all of the domain magnetizations in a respective one of the regions R1, R2 lie within at most a plus or a minus 45° limit of a circumferential direction of the torque transmitting member 12. The sensor configuration according to the embodiment of FIG. 1 is suitable for detecting an axial component of the torque induced magnetic flux, emanating from the circumferentially polarized first magneto-elastically active region R1 (using the first sensor pair S11, S12) and from the second magneto-elastically active region R2 (using the second sensor pair comprising the sensors S21, S22).

The rotating hub shell 6 is supported by the fixed axle 4. The axle 4 is a non-rotating part while the hub shell 6 including the torque transmitting member 12 and the sprocket support 14 are rotating parts. The magneto-elastic sensor means, according to the embodiment of FIG. 1, is arranged in a non-rotating sleeve 16, which is fixed on the axle 4. In other words, the sensor means is a non-rotating part. The sleeve 16 surrounds the axle 4 and serves as a housing for the sensors S11, S12, S21 and S22 of the magneto-elastic sensor means.

In the embodiment FIG. 1, the torque transmitting member 12 is a hollow shaft having an interior space for accommodating the annular sleeve 16. In other words, all sensors S11, S12, S21, S22 of the magneto-elastic sensor means are entirely arranged inside the interior space of the torque transmitting member 12.

FIG. 2 is a simplified side view showing the torque transmitting member 12 of the freewheel hub 2 in FIG. 1. The first magneto-elastically active region R1 and the second magneto-elastically region R2 have a first magnetic polarization P1 and a second magnetic polarization P2, which are substantially 180° opposite to each other. Upon application of a torque to the torque transmitting member 12, the magnetic polarization P1 of the first magneto-elastically active region R1 and the second polarization P2 of the second magneto-elastically active region R2 become increasingly helically shaped in opposite directions. Due to the fact, the sensing directions D11, D12 and D21, D22 of the first and second pair of sensors S11, S12 and S21, S22 are configured to be at least approximately 180° opposite with respect to each other, a differential measurement can be performed. This differential measurement enhances the sensitivity of the torque measurement.

In FIG. 3, there is a simplified cross section of the torque transmitting member 12, which is known from FIG. 1. The configuration of the first sensor pair, comprising the first and the second sensor S11, S12 having the first sensing directions D11 and D12, with respect to the first circumferentially polarized magneto-elastically active region R1 is shown in more detail. Similarly, the configuration of the second sensor pair, comprising the first sensor S21 and the second sensor S22 having the first sensing direction D22 and the second sensing direction D22, is also shown in more detail. The sensors S11, S12, S21, S22 are arranged proximate to the first and second magnetically polarized and magneto-elastically active regions R1 and R2, respectively. In other words, the sensors S11, S12, S21 and S22 are arranged near to an inner wall of the hollow shaft, which serves as a torque transmitting member 12. In particular, the first and the second sensor of a respective one of the sensor pairs is arranged to be substantially opposite to each other with respect to the shaft axis A.

Figure 4:
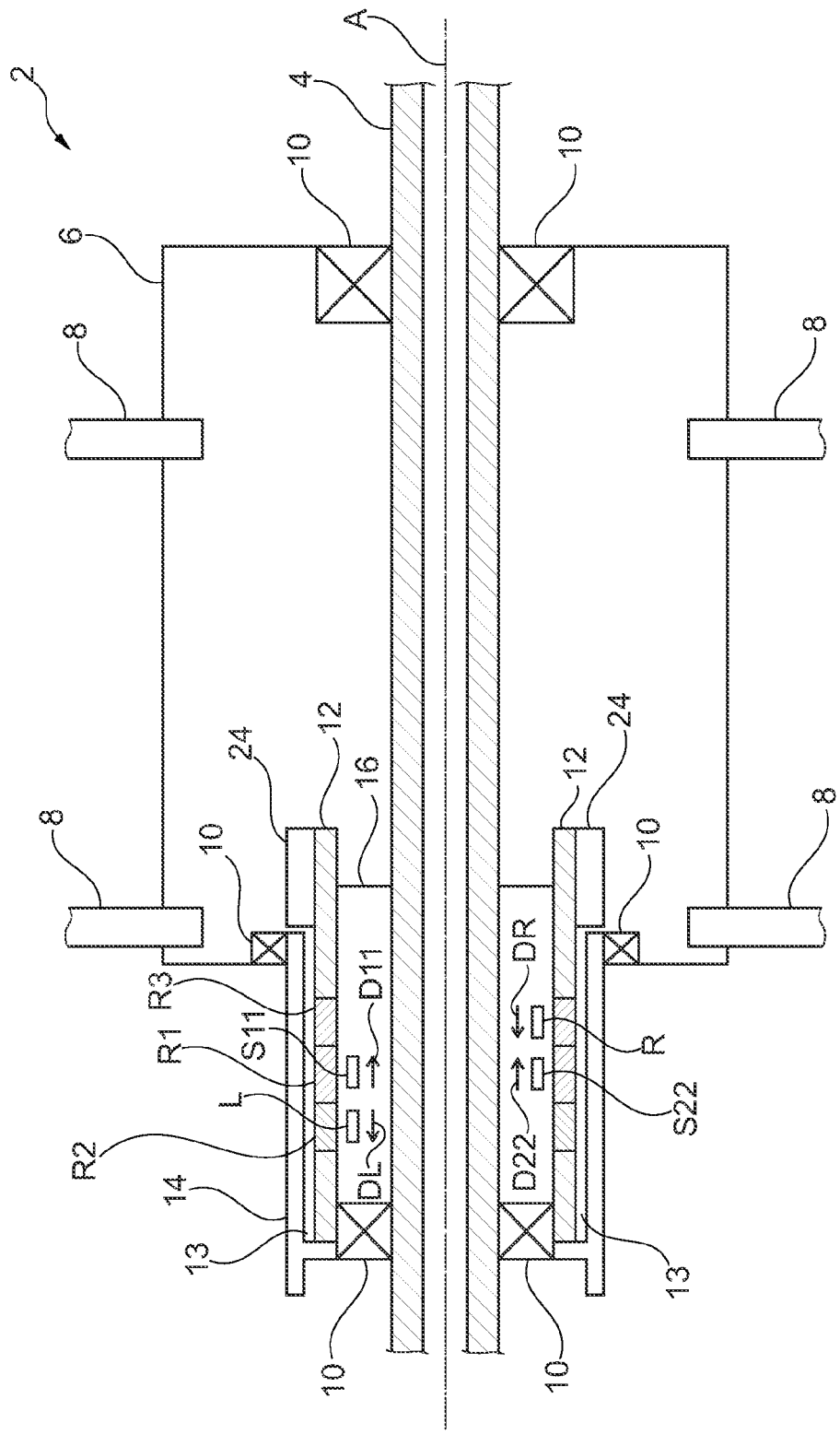
FIG. 4 is a simplified cross section of a freewheel hub according to another embodiment of the invention.

The embodiment of FIG. 4 shows another freewheel hub 2. The freewheel hub 2 of FIG. 4 is configured similar to the freewheel hub 2 of the embodiment in FIG. 1. Similar parts are provided with the same reference numbers.

However, in contrast to the embodiment of FIG. 1, the freewheel hub 2, which is shown in FIG. 4, comprises a torque transmitting member 12, which is a hollow shaft, having three magneto-elastically active regions R1 to R3. Again, the torque transmitting member 12 can be magnetically conditioned using for example magnets or by current, thereby forming the regions R1, R2, R3 having remanent circumferential magnetizations.

The magneto-elastic sensor means of this embodiment comprises a first sensor S11 and a second sensor S22, which form a group of primary magnetic field sensors. The primary magnetic field sensors S11, S22 acquire the torque-induced magnetic field emanating from the first magneto-elastically active region R1. In addition to this, they measure a magnetic near field of a near field source (not shown). The magnetic sensor means further comprises secondary magnetic field sensors R and L. These are arranged right and left of the primary magnetic field sensors S11, S22. The secondary magnetic field sensors R and L measure the torque-induced magnetic fields emanating from the second and third magneto-elastically active region R2, R3 respectively. The sensors R and L further acquire a magnetic near field of the near field source. The magnetic near field can be generated by an arbitrary electro magnetic near field source.

While the magnetic near field measured by the secondary field sensors R, L is cancelled out by the magnetic near field as measured by the primary field sensors S11, S22 (because they are oppositely oriented), the torque-induced magnetic field seen by the primary field sensors S11, S22 is not cancelled out by the value measured by the secondary field sensors R and L. Actually, the torque-induced magnetic fields are additive due to the oppositely polarized magnetization between the first active region R1 and the second and third active region R2, R3, left and right from the first active region R1 in the center. The unwanted magnetic near field is cancelled out and only the torque-induced magnetic field is seen by the primary field sensors S11, S22. The actual computation of the net near field effect value and the net torque-induced field value can be performed using a suitable control unit, which may be an arithmetic logic unit (ALU).

The first and the second sensor S11, S22 have sensing directions D11, D22, respectively, which are substantially 180° opposite to each other. They are further substantially parallel to the shaft axis A. The sensing direction DR of the secondary sensor R to the right and the sensing direction DL of the secondary sensor L to the left are also substantially parallel to the shaft axis A. In contrast to the sensing directions of the first and the second sensor S11, S22, they substantially point in a same axial direction.

Figure 5:
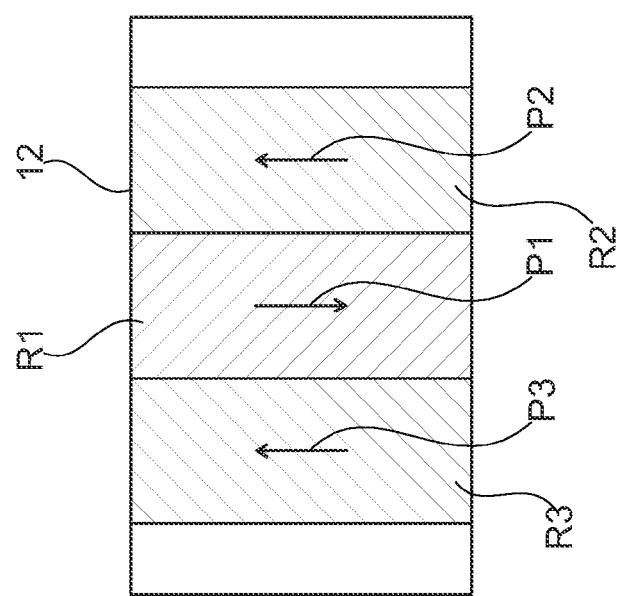
FIG. 5 is a simplified side view of a torque transmitting shaft in a freewheel hub according to an embodiment of the invention.

In FIG. 5, there is a simplified side view showing the torque transmitting member 12 of the freewheel hub 2 according to the embodiment of FIG. 4. The first active region R1 and the second and third active region R2, R3 are arranged to be substantially adjacent to each other, in an axial direction. The first magnetic polarization P1 and the second and third magnetic polarization P2, P3 are substantially 180° opposite with respect to each other.

Figure 6:
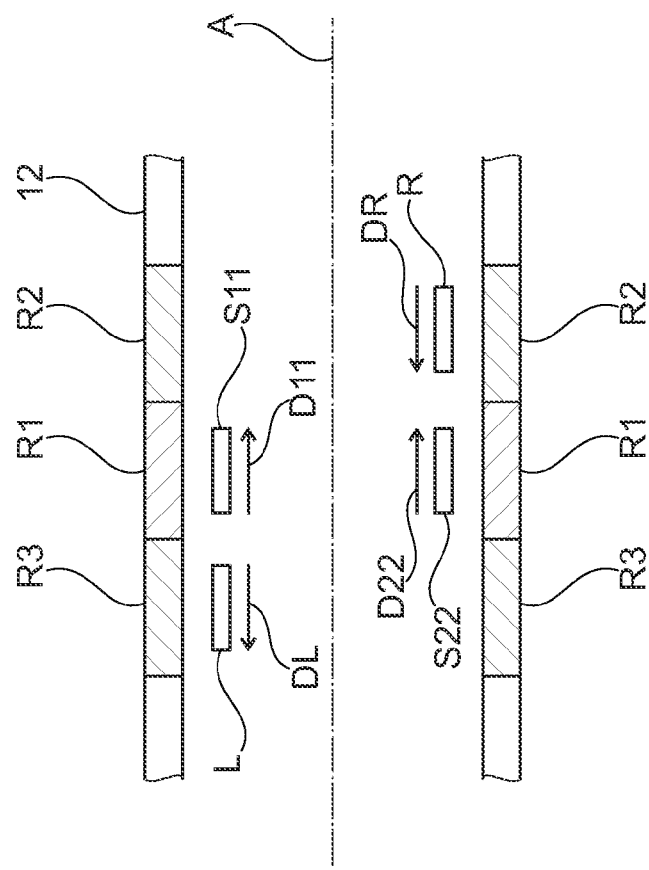
FIG. 6 is a simplified cross section of the shaft shown in FIG. 5.

FIG. 6 is a simplified cross section in axial direction through this torque transmitting member 12, which is a hollow shaft. The figure shows the configuration of the direction sensitive primary sensors S11, S22 and the secondary sensors R and L, with respect to the first to third active region R1 to R3. The torque transmitting member 12 of FIG. 6 is a detailed view to the member 12 of the embodiment of FIG. 4.

FIG. 7 is schematic diagram showing the placement of the primary magnetic field sensors S11 and S22 and the secondary magnetic field sensors R and L inside the torque transmitting member 12, according to an embodiment of the invention. The torque transmitting member 12 has three magnetically polarized regions R1, R2 and R3 having polarizations P1, P2 and P3, as it is indicated using arrows inside the respective active region R1 to R3. There is a near field source 20 emanating a magnetic near field or stray field 22. The near field source 20 can be any source of a magnetic near field.

This embodiment is based on the cancellation of external magnetic fields by placing at least four magnetic field sensors S11, S22, L and R inside the at least partially hollow longitudinally extending torque transmitting member 12 (for example a shaft) and close to magnetic regions R1, R2, R3 conditioned so as to be detectable at the inner surface of the shaft. At least some of the field sensors S11, S22, L and P (or all of them) can be arranged on a board, in particular a printed circuit board (PCB). This aspect provides an (automatic)

alignment of the magnetic field sensors S11, S22, L and R with respect to each other and with respect to the magnetic regions R1, R2 and R3.

The magnetic field sensors S11, S22 at the first and central region R1 have opposite sensing polarity to the magnetic field sensors L, R at the right side and left side regions R2, R3. Thus, the near field measured by the primary magnetic field sensors S11, S22 at the central region R1 is the same magnitude and opposite sign from the averaged values of the near field measured by the secondary magnetic field sensors L, R at the right and left regions R2, R3.

In the diagram of FIG. 7, it is also shown how the magnetic field sensors S11, S22, R and L can be coupled. The first primary magnetic field sensor S11 is coupled with a positive terminal to the negative terminal of the second primary field sensor S22. The negative terminal of the first primary field sensor S11 and the positive terminal of the second primary field sensor S22 are coupled to a means for compensating for the effects of the near magnetic field source 20. This can be an evaluation stage or unit (not shown). According to advantageous embodiments of the invention, this evaluation stage or control unit including all necessary peripherals, such as power supply, data communication interfaces, etc., can be arranged inside the sleeve 16 (see FIGS. 1 and 4). In other words, the entire sensor means can be arranged inside the interior space of the torque transmitting member 12. This is particularly advantageous, if this is a hollow shaft. However, it is also possible that the evaluation stage or control unit is arranged outside the sleeve 16 and exterior to the hollow torque transmitting member 12.

Continuing with the wiring of the sensors, which are shown in FIG. 7, it can be seen that the positive terminal of the secondary sensor R to the right is coupled to the negative terminal of the secondary sensor L to the left. The negative terminal of the right sensor R is coupled to the evaluation unit. The positive terminal of the left sensor L is coupled to the positive terminal of sensor S22 and further to the evaluation unit. The latter is configured for adjusting the first signal of the primary sensors S11, S22 using the signals of the secondary sensors R, L, so as to compensate for the effects of the near magnetic field source 20.

The center C indicates the location of the point of symmetry of this arrangement. The symmetry with respect to this point C already provides a good noise reduction.

The interconnects to the field sensors in combination with the associated electronics are configured an as to average the values of the left and right side regions R2, R3 and sum that average with the value of the center region sensors S11, S22 which, because it is oriented with an opposite polarity, effectively cancels the effects of the near field measurement error. This arrangement using three magnetized regions R1, R2, R3 is also referred to as "tri-band torque sensor."

While the near field is cancelled out, the torque induced magnetic field measured by the primary and secondary magnetic field sensors is not cancelled out because the output of the center region, or primary sensor, is a differential measurement with respect to the left and right region sensors.

In FIG. 8, there is a detail of the freewheel hub 2. The magneto elastic sensor means is omitted in the drawing; however, it can be configured according to one of the embodiments in FIGS. 1 to 7. Again, similar parts are given the same reference numbers. The freewheel hub 2 is provided with a freewheel device 24 or an overrunning clutch. This disengages the driving torque transmitting member 12 from the driven hub shell 6, when the driven member rotates faster than the driving member. The torque T is applied to the freewheel hub 2 via the sprocket support member 14. The line, which is depicted in FIG. 8 illustrates how the torque T is further coupled to the torque transmitting member 12. The air gap 13 between the sprocket support 14 and the torque transmitting member 12 is to avoid any friction between the two parts. The torque T is further coupled to the hub shell 6 via the freewheel device 24.

FIG. 9 is a simplified cross section along the line IX-IX in FIG. 8. The driven outer shell 26 of the freewheel device 24 is rotationally fixed to the hub shell 6. It is saw-toothed at its inner side. This saw-toothing cooperates with a spring loaded pin 27 somewhat like a ratchet. The support 28 carrying the pin 27 is coupled to the torque transmitting member 12 (see FIG. 8). Rotating in one direction, the saw teeth of the driven outer shell 26 lock with the pin 27, making the hub shell 6 rotate at the same speed as the torque transmitting member 12. If the driving part slows down or stops rotating, pin 27 slips over the saw-toothing and the hub shell 6 continues rotating, producing the characteristic clicking sound. Even more sophisticated designs of a freewheel clutch 24, having for example spring-loaded steel rollers, can be applied.

Figure 10:
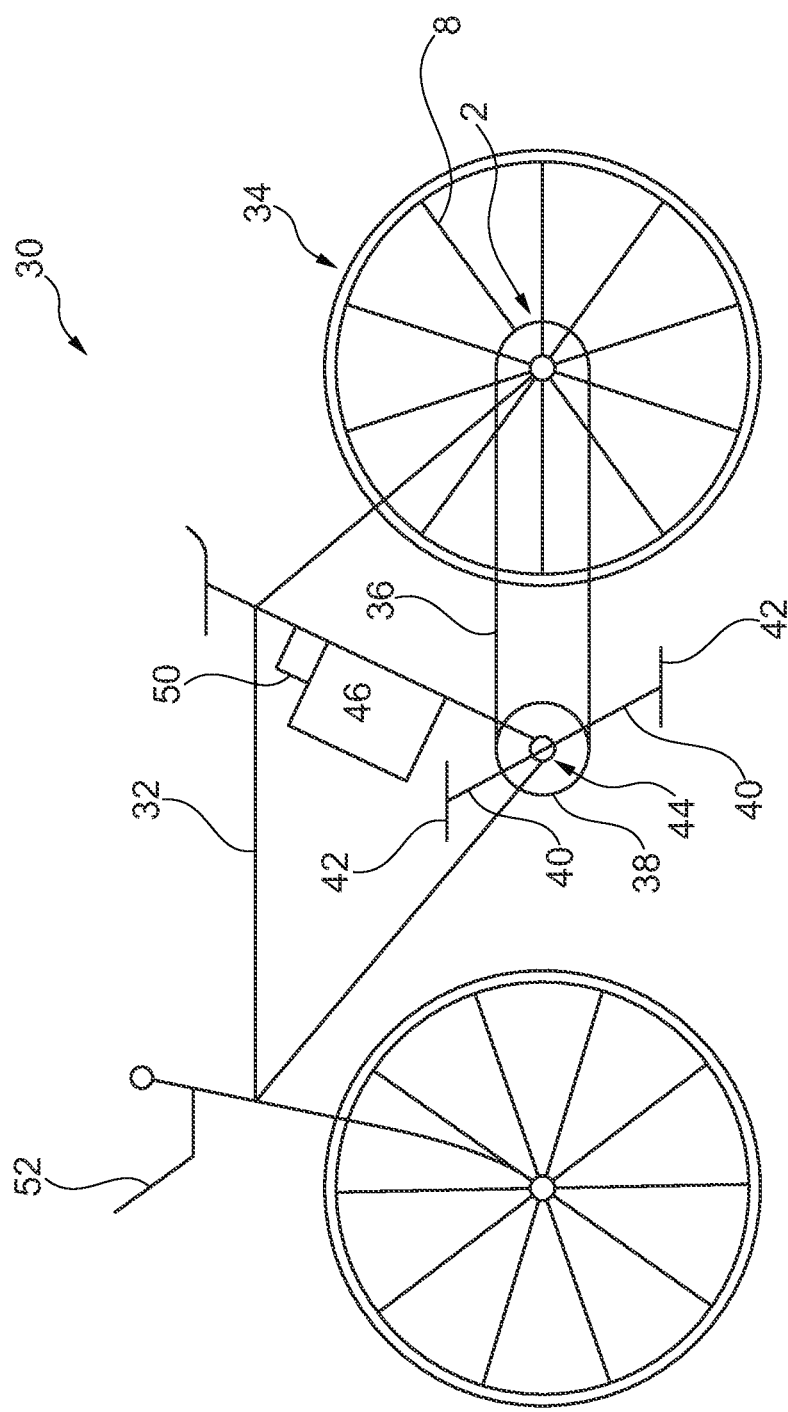
FIG. 10 is a bicycle, a pedelec, a fast pedelec or an e-bike, according to an embodiment of the invention.

FIG. 10 is a simplified bicycle, pedelec, fast pedelec or e-bike 30, according to an embodiment of the invention. The e-bike 30 can be equipped with an auxiliary electric drive. The frame 32 of the e-bike 30 carries a freewheel hub 2, according to embodiments of the invention. A plurality of spokes 8 are mounted on the rotating hub shell 6 of the freewheel hub 2 (see FIG. 1). Together with a wheel rim and a tire, they form a rear wheel 34 of the e-bike 30.

A bicycle chain 36 serves as a torque transmitting device, which couples a large driving sprocket 38 with a smaller sprocket being coupled to the freewheel hub 2. A bottom bracket bearing shaft is coupled to the large geared sprocket 38 and to two crank shafts 40 carrying pedals 42. An auxiliary electric drive can be integrated into the bottom bracket bearing 44. This electric drive can be powered using a battery 46.

The torque, which is applied by the user of the e-bike 30 via the pedals 42 and the crank shafts 40 to the bottom bracket bearing shaft and further via the large sprocket 38 and the bicycle chain 36 to the freewheel hub 2, is acquired using the magneto-elastic sensor means inside the freewheel hub 2. Depending on whether the auxiliary electric drive is active or inactive, the measured torque value refers to the user applied torque or to a total torque, which is generated by the user plus the electric drive. The acquired torque values can be applied for control of the electric auxiliary drive, for activation and/or for deactivation thereof. A suitable control unit 50 can be integrated anywhere in the e-bike 30. Furthermore, the measured torque values can be displayed on a multipurpose bicycle computer 52.

Although the invention has been described hereinabove with reference to specific embodiments, it is not limited to these embodiments and no doubt further alternatives will occur to the skilled person that lie within the scope of the invention as claimed.

The invention claimed is:

1. A freewheel hub comprising a rotating hub shell for carrying a free running wheel, wherein torque is coupled to the rotating hub shell via a torque transmitting member, which is coupled to the hub shell or forms a part of the hub shell, the freewheel hub further comprising:
   a) at least one magneto-elastically active region directly or indirectly attached to or forming a part of the torque transmitting member in such a manner that the applied torque is transmitted to the active region comprising at least one magnetically polarized region such that the polarization becomes increasingly helically shaped as the applied torque increases and b) a magneto-elastic sensor means having at least one magnetic field sensor being arranged proximate to the at least one magneto-elastically active region for outputting a signal corresponding to a torque-induced magnetic flux emanating from the magnetically polarized region, characterized in that the torque transmitting member is a hollow shaft having an interior space, and wherein the magnetic field sensors of the sensor means are arranged inside the interior space of the hollow shaft.

2. The hub of claim 1, wherein the rotating hub shell is supported by a non-rotating fixed axle and the magneto-elastic sensor means is fixed on the non-rotating axle.

3. The hub of claim 1, wherein a freewheel device or an overrunning clutch device is coupled to the torque transmitting member, and wherein the freewheel device or the overrunning clutch device is supported by the torque transmitting member.

4. The hub of claim 3, wherein a driving sprocket is coupled to the torque transmitting member via the freewheel device or the overrunning clutch device so as to provide a free wheel hub, which is driven by the sprocket.

5. The hub of claim 1, wherein the at least one magnetic field sensor has a sensing direction, which is at least substantially parallel to a shaft axis so as to detect an axial component of the torque-induced magnetic flux emanating from the magnetically polarized region.

6. The hub of claim 1, wherein the sensor means comprises at least two magnetic field sensors having sensing directions, which are at least substantially 180° opposite to each other.

7. The hub of claim 1, wherein the at least one magneto-elastically active region projects along a circumference of the torque transmitting member, wherein the at least one region is magnetized so that all domain magnetizations in the region lie within at most a plus or minus 45° limit of a circumferential direction of the torque transmitting member.

8. The hub of claim 1, wherein
a) the torque transmitting member comprises a first magneto-elastically active region and a second magneto-elastically active region, which are axially spaced and directly or indirectly attached to or form a part of the torque transmitting member in such a manner that the torque is transmitted to the active regions, each active region comprising a magnetically polarized region, wherein the magnetic polarization of the first active region and the magnetic polarization of the second active region are substantially opposite to each other,
b) the magnetic sensor means comprises a first pair of sensors comprising a first and a second magnetic field sensor being arranged proximate to the first magneto-elastically active region for outputting a first signal corresponding to a torque-induced magnetic flux emanating from the first magnetically polarized region and
c) the magnetic sensor means comprises a second pair of sensors comprising a first and a second magnetic field sensor being arranged proximate to the second magneto-elastically active region for outputting a second signal corresponding to a torque-induced magnetic flux emanating from the second magnetically polarized region,
d) the hub further comprises a control unit, which is configured for determination of the applied torque by performing a differential evaluation of the signals of the first pair of sensors and the signals of the second pair of sensors.

9. The hub of claim 1, wherein the magnetic sensor means comprises a plurality of primary magnetic field sensors arranged proximate to a first magneto-elastically active region for outputting a first signal corresponding to a torque-dependent magnetic flux emanating from this active region,
a) at least one secondary magnetic field sensor axially spaced in a first direction by a pre-determined first distance from the plurality of primary magnetic field sensors, said at least one secondary magnetic field sensor being arranged proximate to a second magneto-elastically active region for outputting a second signal corresponding to a torque-dependent magnetic flux emanating from this second active region and an ambient magnetic flux emanating from a near magnetic field source,
b) at least one further secondary magnetic field sensor axially spaced in a second direction substantially opposite to the first direction by a pre-determined second distance from the plurality of primary magnetic field sensors said at least one further secondary magnetic field sensor being arranged proximate to a third magneto-elastically active region for outputting a third signal corresponding to a torque-dependent magnetic flux emanating from this third active region and the ambient magnetic flux emanating from the near magnetic field source,
c) means for adjusting the first signal using the second and the third signals thereby compensating for the effects of the near magnetic field source.

10. The hub of claim 1, wherein the at least one magnetic field sensor is a vector sensor comprising one of: a Hall effect, magnetoresistance, magnetotransistor, magnetodiode, MAGFET field sensor or a fluxgate magneto meter.

11. The hub of claim 1, wherein the torque transmitting member is at least partially formed of ferromagnetic material suitable for providing an elastomagnetic effect, wherein the ferromagnetic material contains Ni.

12. A bicycle, a pelelec, a fast pedelec or an e-bike, comprising a freewheel hub according to claim 1.

13. The bicycle, pelelec, fast pedelec or e-bike of claim 12, further comprising a battery powered electric drive, which applies a torque to the torque transmitting member of the hub.

* * * * *